S. G. TATE.
SEWING MACHINE.
APPLICATION FILED MAY 6, 1918.

1,370,164.

Patented Mar. 1, 1921.
10 SHEETS—SHEET 4.

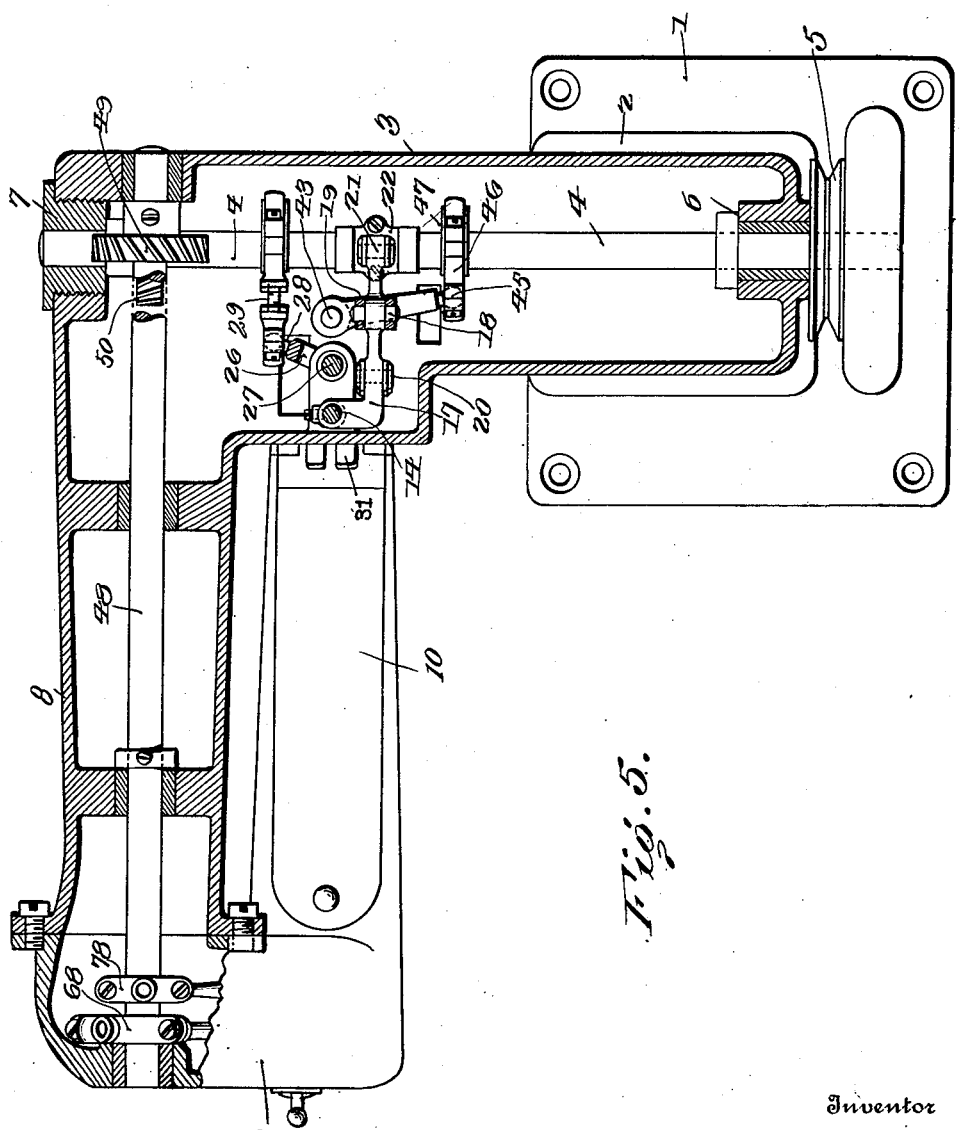

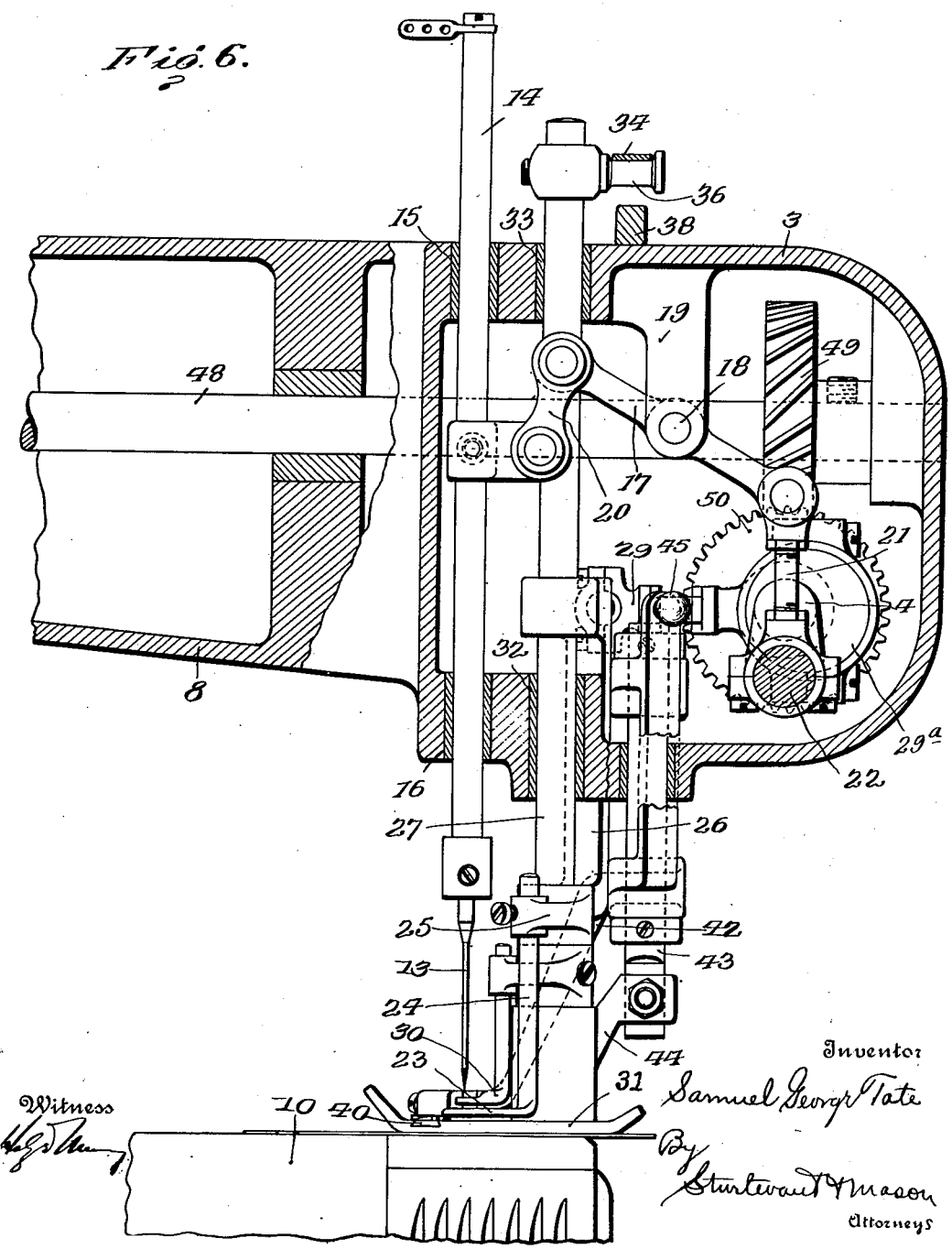

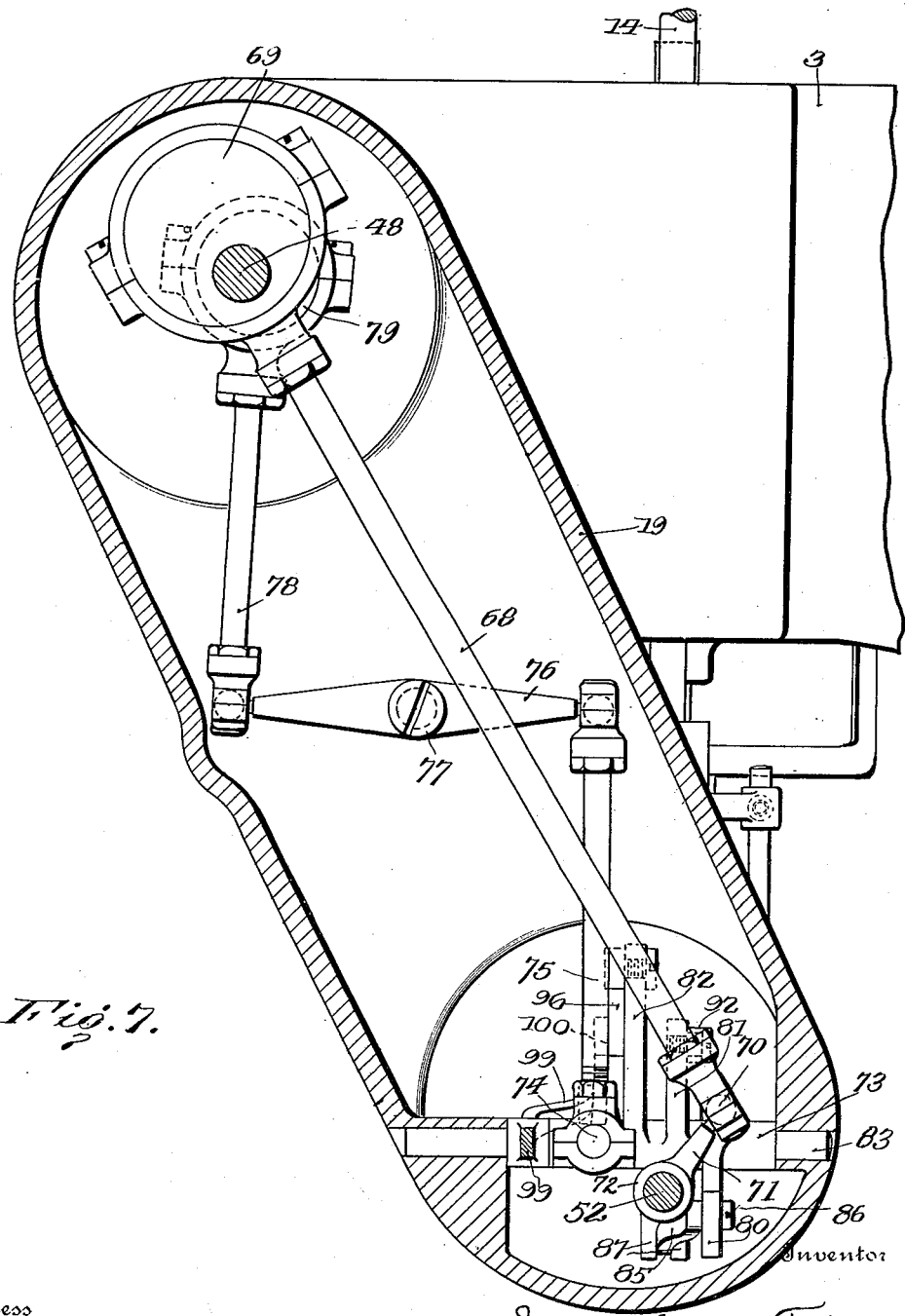

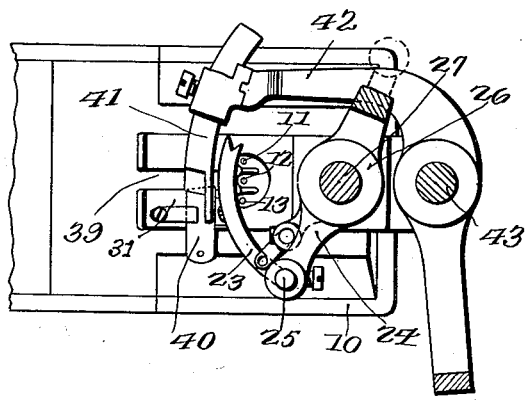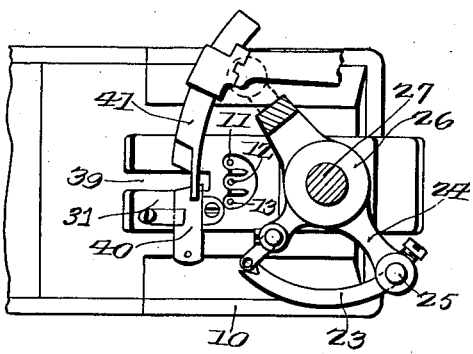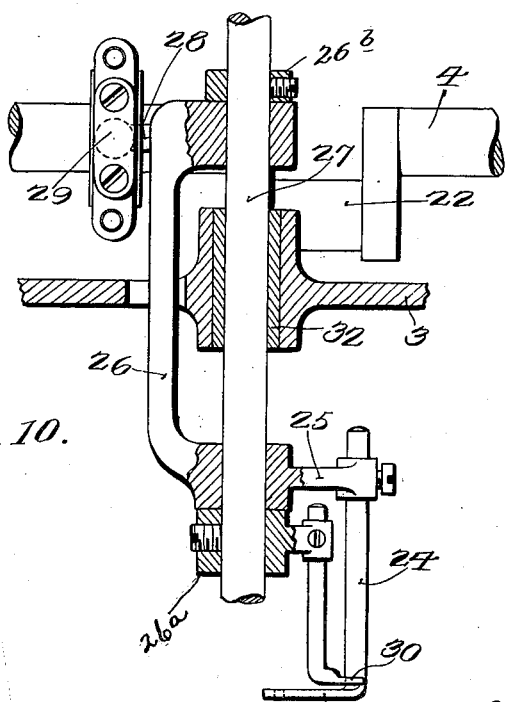

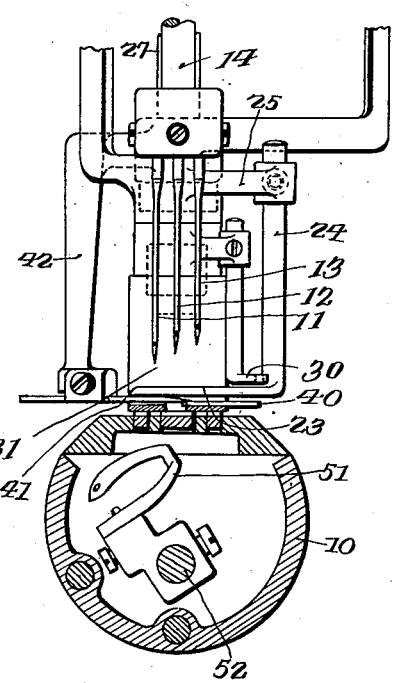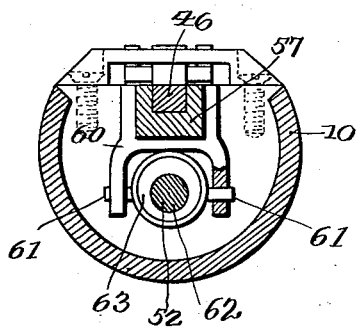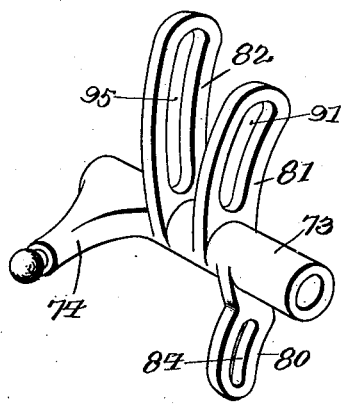

S. G. TATE.
SEWING MACHINE.
APPLICATION FILED MAY 6, 1918.

1,370,164.

Patented Mar. 1, 1921.
10 SHEETS—SHEET 10.

Inventor
S. G. Tate
By
Sturtevant Mason
Attorneys

UNITED STATES PATENT OFFICE.

SAMUEL GEORGE TATE, OF CHICAGO, ILLINOIS, ASSIGNOR TO UNION SPECIAL MACHINE COMPANY, OF CHICAGO, ILLINOIS, A CORPORATION OF ILLINOIS.

SEWING-MACHINE.

1,370,164.     Specification of Letters Patent.     Patented Mar. 1, 1921.

Application filed May 6, 1918. Serial No. 232,898.

*To all whom it may concern:*

Be it known that I, SAMUEL GEORGE TATE, a citizen of the United States, residing at Chicago, in the county of Cook, State of Illinois, have invented certain new and useful Improvements in Sewing-Machines, of which the following is a description, reference being had to the accompanying drawing and to the figures of reference marked thereon.

An object of the invention is to provide a sewing machine having a rearwardly extending work supporting arm which is carried by a depending member supported at the outer end of an arm projecting forwardly from a standard, wherein the work supporting arm is so positioned relative to the parts carrying the same as to give the operator a clear range of vision of the stitching point at the free end of the work supporting arm from the operator's normal working position.

A further object of the invention is to provide a machine of the above character wherein the work supporting arm is parallel with the forwardly projecting arm carrying the same but is offset therefrom vertically, so as to provide the clear range of vision above referred to.

A still further object of the invention is to provide a machine of the above character wherein the depending support which carries the work supporting arm is inclined to the vertical, so as to vertically offset the work supporting arm from the parts carrying the same for the purpose of giving the clear range of vision referred to.

These and other objects will in part be obvious and will in part be hereinafter more fully disclosed.

In the drawings which show by way of illustration one embodiment of the invention:

Fig. 5 is a view partly in plan and partly in section, the section being taken so as to show the operating shafts and the manner of supporting the same;

Fig. 6 is a vertical sectional view through the laterally projecting arm, showing the devices for operating the needle bar, the thread laying mechanism and the trimmer and also showing the actuating shaft which operates the feed and the complemental stitch forming mechanism;

Fig. 7 is a view partly in front elevation and partly in section showing the connections between the actuating shaft and the looper supporting shaft and also the connection between the actuating shaft and the feeding mechanism;

Fig. 8 is a detail partly in plan and partly in section showing the presser foot, the trimming blades, the cross thread laying hook in its forward position and the devices for supporting the same;

Fig. 9 is a detail partly in plan and partly in section showing the presser foot, the trimming blades, the stationary thread guide and the thread hook with the thread hook retracted;

Fig. 10 is a view partly in side elevation and partly in sectional elevation showing the supporting yoke for the thread book, the fixed thread guide and the link for operating the yoke;

Fig. 11 is a view partly in front elevation and partly in section, showing the end of the work supporting arm, the looper, the needles, the presser foot, the thread hook and the fixed thread guide and also the trimming blades;

Fig. 14 is a sectional view on the line 14—14 of Fig. 11; and

Fig. 15 is a perspective view of the three armed lever for operating the feed bars and for moving the looper shaft endwise.

The invention is directed broadly to a sewing machine for stitching tubular articles. The fabric to be stitched to form the tubular article is fed along a work supporting arm and off from the end of the arm. This work supporting arm is suspended so as to provide a clearance space underneath the same for the fabric to pass.

The machine includes a standard having at its upper end a laterally projecting member and mounted in the standard and projecting member is the main operating shaft. Projecting forwardly from the end of the laterally projecting member is an arm, in which is located a shaft. At the forward end of this arm is a depending support which carries the work supporting arm proper. Located in the depending support are the actuating devices for the feed bars and also for the looper, the feed bars being disposed in the work supporting arm and the looper arranged at the free end of the arm. Mounted in the laterally projecting arm and between the standard and the outer end thereof is the needle bar carrying the needles with which the looper coöperates. The needles are operated by a needle lever which is actuated from the main shaft. The depending support for the work supporting arm is arranged in a plane inclined to a vertical plane containing the longitudinal axis of the work supporting arm. The work supporting arm projects directly away from the operator and this inclining of the depending support offsets the work supporting arm vertically from underneath the projecting arm at the point where the depending support is mounted and gives a clear view of the stitching point for the operator's normal working position.

Figure 1:
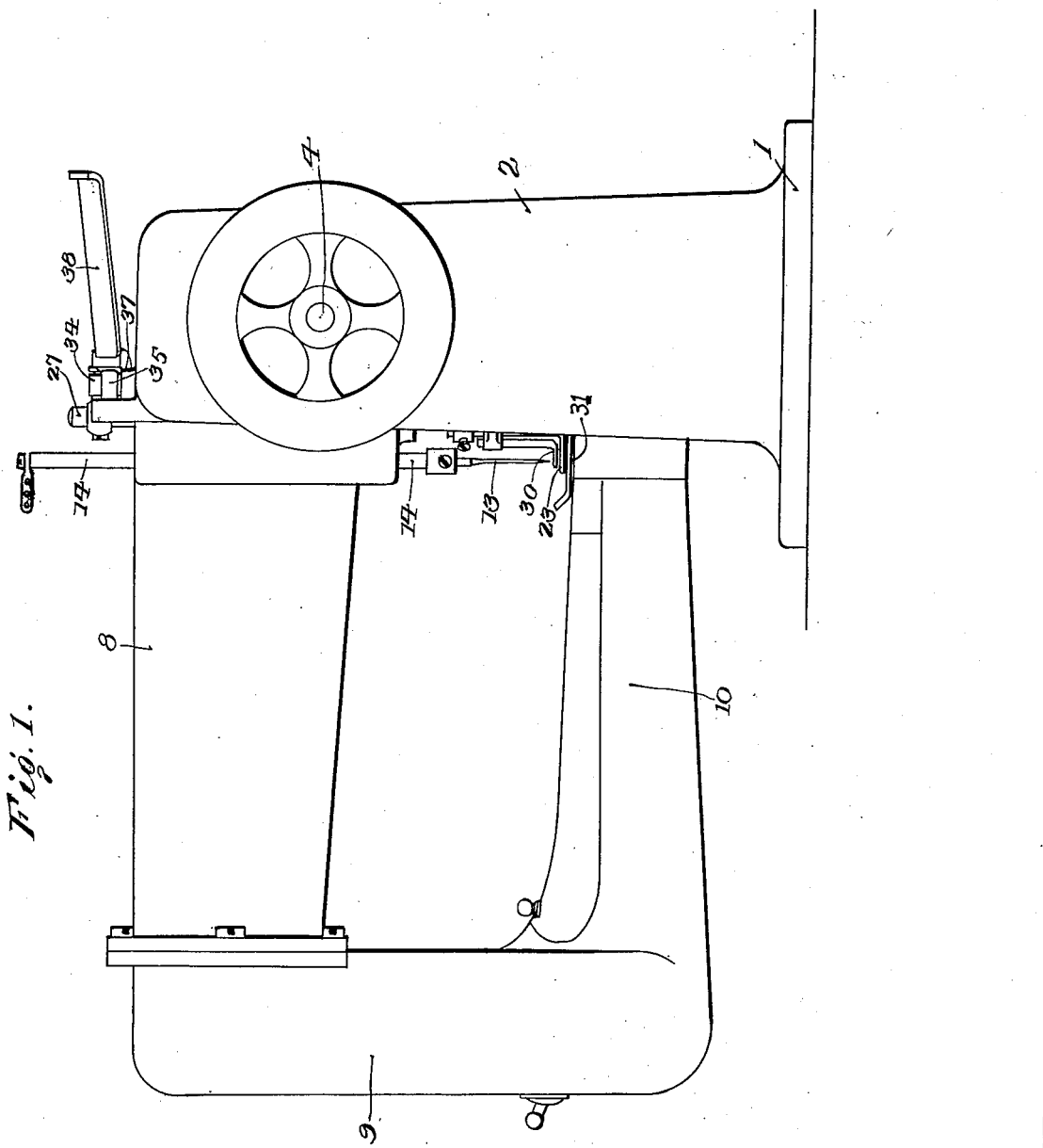
Figure 1 is a side view of a sewing machine embodying my invention.
Figure 2:
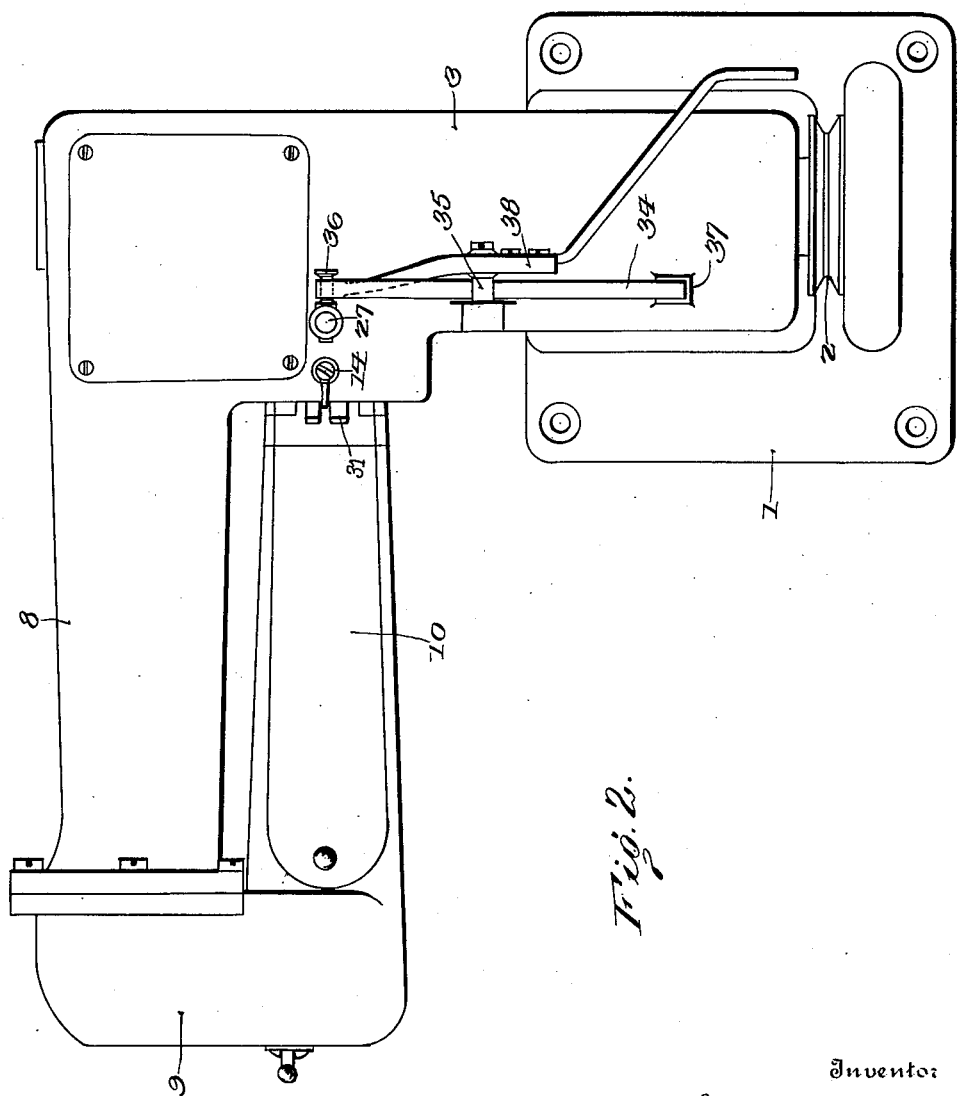
Fig. 2 is a plan view of the same.
Figure 3:
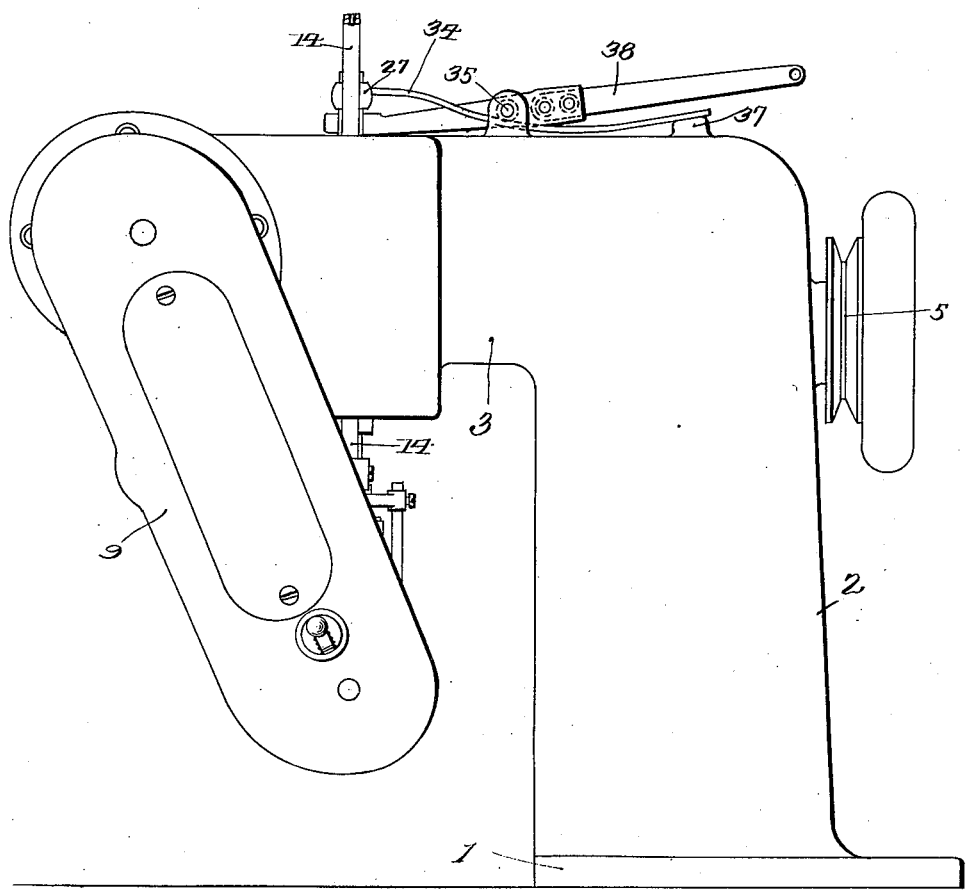
Fig. 3 is a front end view of the same.
Figure 4:
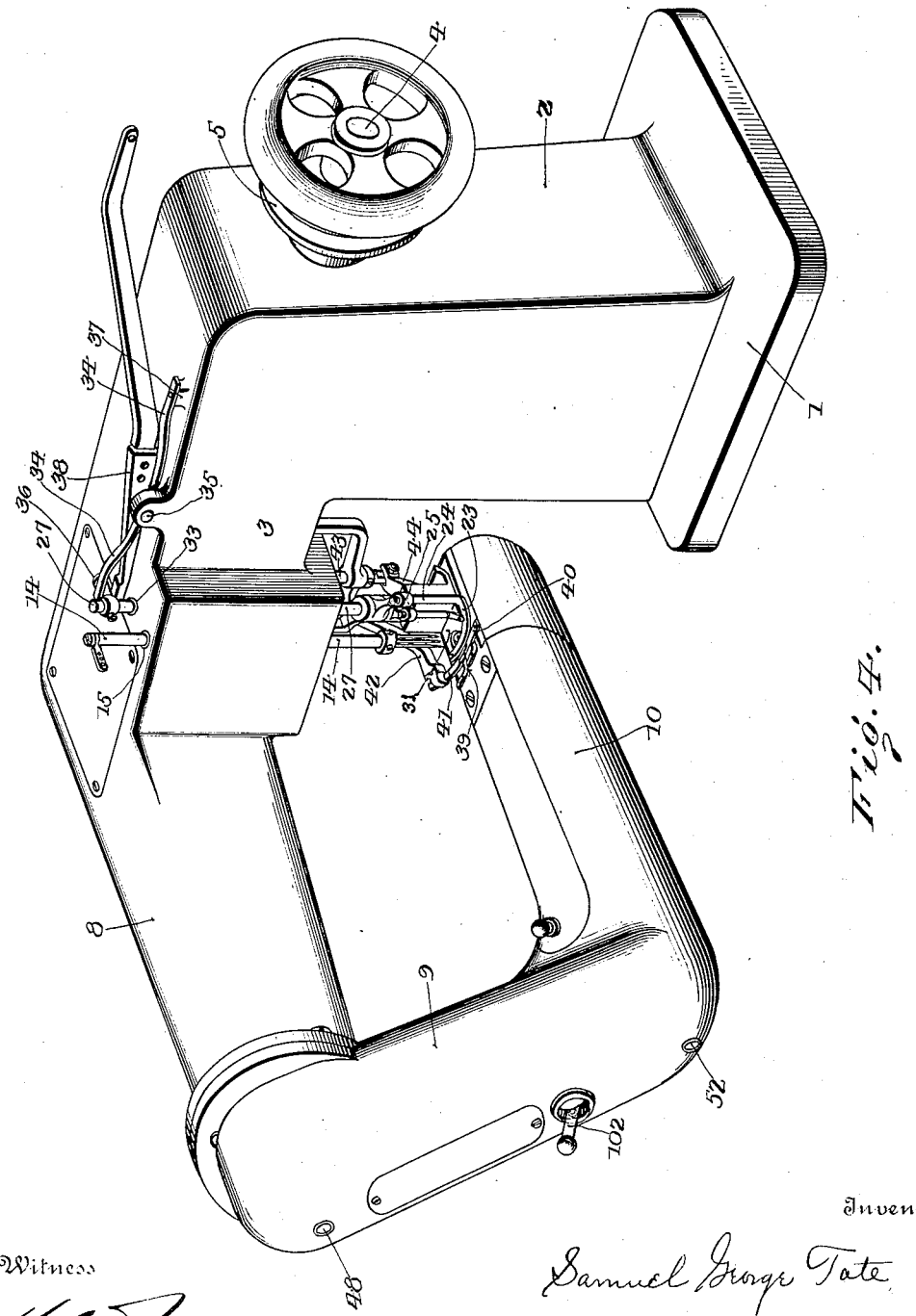
Fig. 4 is a perspective view of the standard and the frame structure supported thereby, with the operating parts omitted.

Referring more in detail to the drawings, my invention consists of a sewing machine having a supporting base 1 from which rises a standard 2. Said standard has a laterally projecting member 3 extending from the upper end thereof. Mounted in the standard and in the laterally projecting member 3 is the main shaft 4 which is horizontal and is provided with a suitable belt and hand wheel 5. The shaft 4 is mounted in suitable bearings 6 and 7. Projecting forwardly from the outer end of the laterally projecting member 3 is an arm 8. Extending downwardly from the forward end of the arm 8 is a hollow depending support 9. The depending support 9 is located in a plane which is inclined to the vertical as clearly shown in Figs. 3 and 4 of the drawings, and carried by the lower end of this depending support 9 is a work supporting arm 10 which projects away from the operator. The work supporting arm is parallel with the projecting arm 8 but offset thereupon vertically. The machine is arranged on a table so that the main shaft is horizontal and parallel with the front of the table and whereby the operator may sit directly in front of the depending support 9. The free end of the work supporting arm 10 terminates underneath the laterally projecting arm 3 and inasmuch as the depending support is inclined as shown in the drawings, so that the lower end thereof is nearer the standard than the upper end, said free end of the work support is underneath the lateral supporting arm at a point between the extreme outer end of the arm and the standard. The length of the lateral member 3 is such that the free end of the work supporting arm is spaced from the standard a sufficient distance to give ample clearance for the material after being stitched to pass off from the end of the arm. The machine is especially adapted for joining the edges of fabric sections and for covering said joined edges. As shown in the drawings, the stitching mechanism includes three needles 11, 12 and 13. These needles are carried by a needle bar 14 which is mounted to reciprocate in the bearings 15 and 16 carried by the lateral projecting member 3. The needle bar is reciprocated by a lever 17 fulcrumed at 18 on a lug 19 carried by the laterally projecting member 3. This lever 17 is connected to the needle bar by a link 20. The other end of the lever 17 connects with a link 21 which coöperates with a crank 22 formed in the main shaft 4. As the main shaft rotates, the lever 17 is oscillated and reciprocates the needle bar.

Associated with the needles is a cross thread laying mechanism which in the present embodiment of the invention, includes a thread hook 23. This thread hook 23 is provided with a shank 24 mounted in an arm 25 carried by a yoke 26 which is freely journaled on the presser bar 27. A sleeve 26$^a$ and a collar 26$^b$ secured to the presser bar 27 prevent endwise movement of the yoke 26 on the presser bar and cause the yoke to move up and down with the presser bar. Said yoke adjacent its upper end is provided with an arm 28 having a ball stud to which an eccentric strap 29 is connected This eccentric strap coöperates with an eccentric 29$^a$ on the main shaft 4. Associated with the hook is a fixed thread guide 30 which is carried by the sleeve 26$^a$. The cross thread is led from the supply in any suitable way to this fixed thread guide and the cross thread laying hook moving underneath the thread guide engages the cross thread and forms a loop therein which is properly positioned for the needles so that the cross thread will connect the needle threads and thus cover the edges of the fabric sections being joined.

The material is held on the work support by a presser foot 31. The presser foot is carried by the presser bar 27. Said presser bar is mounted in bearings 32 and 33 carried by the laterally projecting arm 3 and the presser foot is forced downwardly into engagement with the work support by a flat spring 34. The spring 34 extends underneath the pin 35 and bears on a pin 36 carried by the presser bar. The other end of the spring rests on a flat lug 37. The presser bar is raised by a lever 38 fulcrumed on the pin 35 and having its free end extending underneath the pin 36.

It is often desirable to trim the edges of the fabric sections which are to be united, particularly when forming a flat seam where the edges are abutted. I have shown the presser foot as formed with a guiding slot 39 through which the upturned edges of the fabric sections may be directed and these edges will be trimmed by horizontally disposed trimming blades. The fixed trimming blade is indicated at 40 and this blade is clamped in a suitable recess in the presser foot and its cutting edge is preferably located at one of the side walls of the guiding slot 39. The movable blade is indicated at 41 and this blade crosses the slot and coöperates with the fixed blade in trimming the fabric. The movable blade is carried by a lever 42 which is mounted to swing freely on a guide bar 43 and this guide bar 43 is connected to an arm 44 extending from the presser foot, so that the guide bar moves up and down with the presser bar, the arm 44 serving also to hold the foot against turning. The lever 42 includes a yoke having two points of connection with the guide bar 43 and at the upper end of this yoke there is an arm 45 having a ball stud connected to an eccentric strap 46 coöperating with an eccentric 47 on the main shaft 4. As the main shaft rotates, the movable trimming blade will be moved back and forth and the fabric edges trimmed. After they are trimmed, they pass underneath the presser foot where they are entered by the needles 11, 12 and 13. The edges may be abutted, in which case the needles 11 and 13 will pass through the respective fabric sections at opposite sides of the abutted edges, while the central needle will pass between the abutted edges. The edges may be slightly overlapped, in which case the center needle will pass through the overlapped edges.

It will be understood that the stitch forming mechanism, the trimming mechanism and the cross thread laying mechanism may be varied. In fact the trimming mechanism may be omitted and also the cross thread laying mechanism may be omitted in certain characters of work, the essential feature being that there shall be some form of stitch forming mechanism which operates at the free end of the work support for stitching the edges of the fabric so as to join the same to form a tube; such for example, as the sleeve of a garment or the tubular parts of a union suit or the like.

Figure 12:
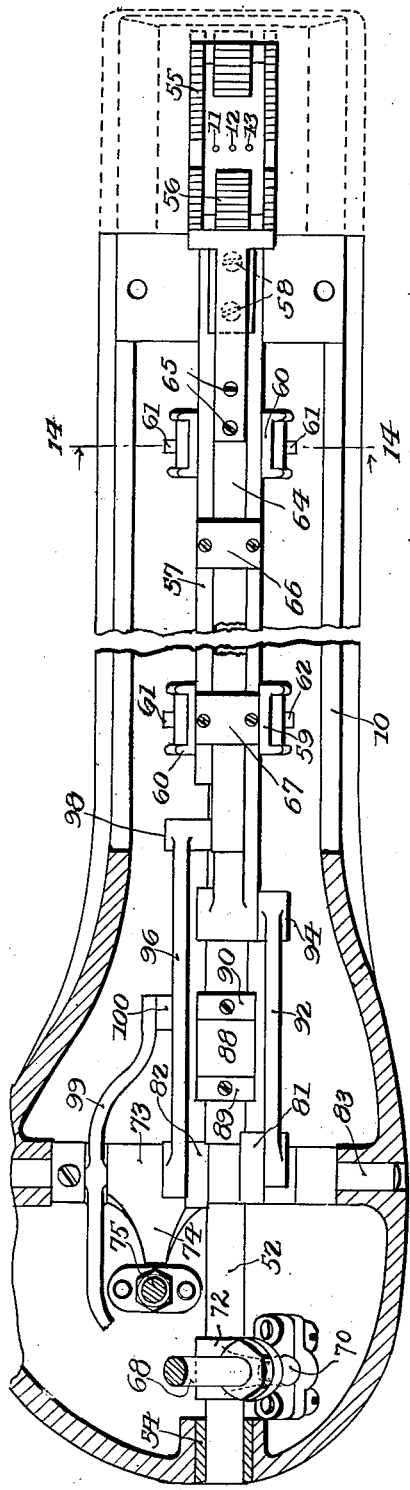
Fig. 12 is a view partly in top elevation and partly in horizontal section showing the feed bars, the looper supporting shaft and the devices for operating the same.
Figure 13:
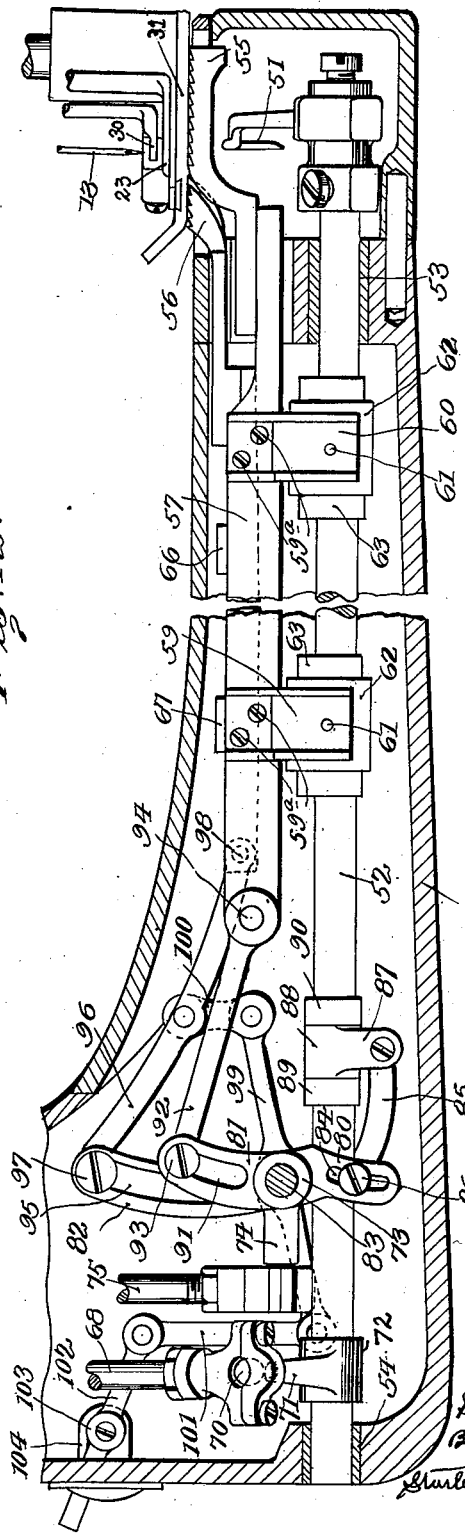
Fig. 13 is a vertical sectional view through the work supporting arm, also showing the presser foot and the needles.

Extending lengthwise of the arm 8 is a cross shaft 48. This cross shaft is mounted in suitable bearings in the arm 8. The cross shaft 48 is located above the main shaft 4. Said cross shaft 48 is provided with a spiral gear 49 which is adapted to mesh with a spiral gear 50 on the main shaft 4, so that the shaft 48 will be rotated by the shaft 4. Located in the work supporting arm 10 is a looper 51. This looper is fixed to a looper shaft 52 mounted in suitable bearings 53 and 54. The looper shaft is capable of oscillating and also endwise movement in the bearings 53 and 54. The looper coöperates with all three needles in the present embodiment of the invention, so that the needle loops will not only be locked by the looper thread, but the needle threads will be joined by the looper thread, which crosses the meeting edges of the fabric and thus covers the same. The material is fed lengthwise of the work supporting arm and off from the end thereof by a feeding mechanism which includes a main feed dog 55 and, as is herein shown, an auxiliary feed dog 56. The main feed dog is rigidly attached to the main feed bar 57 by screws 58 (see Figs. 12 and 13). The main feed bar is supported by two yokes 59 and 60. These yokes are similar in construction and are fixed to the feed bar by screws 59$^a$. As clearly shown in Fig. 13 of the drawings, the yoke is pivoted at 61 to a sleeve 62 which coöperates with an eccentric 63 fixed to the shaft 52. The sleeve 62 is free to slide on the eccentric as the feed bar moves back and forth. As above noted there are two yokes and consequently two eccentrics 63. These eccentrics are similarly timed so that the feed bar 57 will be bodily raised and lowered at both ends thereof as the shaft 52 is oscillated to move the looper into and out of the needle loops. This up and down movement of the feed bar carries the feed dog supported thereby into and out of engagement with the material. It is to be noted that as the feed bar moves bodily up and down, the feed dog will be carried into engagement with the material without being tilted and the entire surface of the feed dog will therefore become active to feed the material. The auxiliary feed dog 56 is fixed to an auxiliary feed bar 64 by means of screws 65. The auxiliary feed bar is supported in a groove or recess extending from end to end of the main feed bar and said auxiliary bar is held therein by cover plates 66 and 67. The auxiliary feed bar is free to slide endwise in the recess in the main feed bar, but said auxiliary feed bar will be moved up and down with the main feed bar.

The looper supporting shaft 52 is oscillated by means of an eccentric strap 68. This eccentric strap coöperates with an eccentric 69 on the cross shaft 48. The lower end of the eccentric strap is connected to a ball stud 70 on the end of an arm 71 carried by a collar 72, clamped to the looper shaft 52.

Mounted in the work supporting arm at the rear end thereof is a rocking frame 73. Said rocking frame is formed with an arm 74 having a ball stud on its outer end with which a vertical link 75 is connected. The link 75 at its upper end is connected to a horizontal lever 76 which is mounted to swing on a bearing stud 77. The other end of the lever 76 is connected to a vertical eccentric strap 78 which coöperates with an eccentric 79 on the cross shaft 48. As the cross shaft rotates, the lever 76 is oscillated and this in turn oscillates the rocking frame 73. As clearly shown in Fig. 15 of the drawings the rocking frame is also provided with three arms 80, 81 and 82. These arms are formed integral with a sleeve mounted on a fixed cross shaft 83. The downwardly projecting arm 80 is provided with a segmental slot 84. A link 85 has an adjustable connection at one end with said slot by means of a screw stud 86. The other end of this link 85 is pivotally connected to downwardly projecting arms 87 carried by a sleeve 88 freely mounted on the looper supporting shaft 52. This sleeve 88 is located between two collars 89 and 90 which are fixed to the looper supporting shaft. This permits the shaft to freely oscillate in the sleeve but any movement of the rock shaft will move the sleeve endwise and thus move the looper supporting shaft endwise, which gives to the looper its lateral or needle avoiding movement. The arm 81 is provided with a segmental slot 91. A link 92 is adjustably connected to this arm 81 by means of a screw stud 93 which can slide in the slot and be clamped at any desired position in the slot. The other end of the link 92 is pivoted at 94 to the main feed bar 57. As this rocking frame 73 oscillates the arm 81 through the link 92 will move the main feed bar back and forth of the extent of movement of the main feed bar and therefore the extent of feed stroke given to the main feed dog will be determined by the position of the screw stud 93 in the slot 91.

The arm 82 has a segmental slot 95 formed therein. A link 96 is connected to a screw stud 97 which may be freely moved in the slot 95. This link 96 is pivoted at 98 to the auxiliary feed bar 64 so that as the arm 82 moves back and forth the auxiliary feed bar will be moved back and forth and thus impart the feeding movements to the auxiliary feed dog. The extent of movement of the auxiliary feed dog will be determined by the position of the screw stud 97 in the slot 95. This position of the stud 97 may be readily varied by a lever 99 which is fulcrumed on the shaft 83, and which is connected at one end by a link 100 to the link 96. The other end of the lever 99 is connected by a link 101 to a hand lever 102 fulcrumed at 103 on a lug 104 and extending outside of the depending support 9 where it is readily accessible to the operator. Suitable means may be provided for holding the hand lever 102 in adjusted positions. By adjusting this hand lever the position of the stud 97 will be varied and thus the feed stroke of the auxiliary feed dog will be varied. Inasmuch as the link 75 is substantially vertical throughout its movement, there will be no thrust on the rocking frame 73 in a direction endwise of the cross shaft 83 which supports the same. This enables the rocking frame to move freely on the cross shaft without binding.

The feeding mechanism *per se*, as herein shown and described, forms no part of the present invention but is shown, described and claimed in my co-pending application, Serial Number 232,899, filed of even date herewith.

From the above description it will be apparent that I have provided a sewing machine which is especially adapted for stitching tubular articles. The operator sits directly in front of the work supporting arm which projects rearwardly from the operator. This work supporting arm is carried by a forwardly projecting arm which is preferably parallel with the work supporting arm but the means for supporting the work supporting arm from its forwardly projecting arm is so inclined or shaped that the work supporting arm is offset vertically from the forwardly projecting arm and this gives a clear view of the stitching point from the operator's normal working position; that is, while sitting in a natural position directly in front of the work supporting arm and guiding the material onto the arm. Then again the members of the frame supporting the work supporting arm and containing the operating devices for the parts within the work supporting arm have comparatively few turns, so that there are relatively short connections between these operating parts in the work support and the main horizontal driving shaft. The machine therefore is not only of comparatively few parts and simple in construction, but may be operated without any particular strain upon the operator who may sit in a natural position relative to the machine and guide the material thereto.

It is obvious that minor changes in the arrangement and the shaping of the parts may be made without departing from the spirit of the invention as set forth in the appended claims.

Having thus described my invention, what I claim as new and desire to secure by Letters Patent, is:—

1. A sewing machine including in combination a standard, an arm supported thereby and projecting forwardly therefrom, a depending support carried by said arm, a rearwardly extending work supporting arm carried at the lower end of said depending support, stitch forming mechanism operating at the free end of said work supporting arm, feeding mechanism for feeding the fabric lengthwise of said work supporting arm, a horizontally disposed main shaft for operating the stitching mechanism and feeding mechanism, said depending support and work supporting arm being disposed in a plane inclined to a vertical plane containing the vertical axis of the standard whereby a clear range of vision of the stitching point may be had from the operator's normal working position.

2. A sewing machine including in combination a standard, a laterally extending member, an arm supported thereby and projecting forwardly therefrom and at right angles thereto, a depending support carried by said arm, a rearwardly extending work supporting arm carried at the lower end of said depending support, stitching mechanism operating at the free end of said work supporting arm, feeding mechanism for feeding the fabric lengthwise of the work supporting arm, a horizontally disposed main shaft for operating the stitching mechanism and feeding mechanism, said work supporting arm having its longitudinal axis parallel with the longitudinal axis of the arm carrying said depending support and offset vertically from said supporting arm whereby a clear range of vision may be had of the stitching point from the operator's normal working position.

3. A sewing machine including in combination a standard, an arm projecting forwardly therefrom, a depending support carried by said arm, a rearwardly extending work supporting arm carried at the lower end of said depending support and having its free end adjacent the standard, stitching mechanism operating at the free end of said work supporting arm, feeding mechanism for feeding the fabric off from the arm as it is stitched, said depending support and work supporting arm being disposed in a plane inclined to the vertical and cutting a line containing the longitudinal axis of the standard at an acute angle whereby a clear range of vision may be had from the operator's normal working position.

4. A sewing machine including in combination a standard, a member projecting laterally therefrom at the upper end of the standard, an arm projecting forwardly from said laterally projecting member, a depending support carried by said arm at the forward end thereof, a work supporting arm carried by said depending support and having its free end terminating underneath the laterally projecting member, stitch forming mechanism operating at the free end of said work supporting arm and feeding mechanism for feeding the fabric off from the arm as it is stitched, said depending support and work supporting arm having a clearance space underneath the same whereby tubular articles may be stitched, said depending support and work supporting arm being disposed in a plane cutting a line containing the longitudinal axis of the standard at an acute angle, whereby a clear range of vision may be had from the operator's working position.

5. A sewing machine including in combination a standard, a member projecting laterally therefrom at the upper end of the standard, an arm projecting forwardly from said laterally projecting member, a depending support carried by said arm at the forward end thereof, a work supporting arm carried by said depending support and having its free end terminating underneath the laterally projecting member, stitch forming mechanism operating at the free end of the said work supporting arm and feeding mechanism for feeding the fabric off from the work supporting arm as it is stitched, said depending support and work supporting arm having a clearance space underneath the same whereby tubular articles may be stitched, said depending support and work supporting arm being disposed in a plane cutting a line containing the longitudinal axis of the standard at an acute angle whereby a clear range of vision may be had from the operator's normal working position, the free end of said work supporting arm being disposed at one side of the standard and spaced therefrom so as to provide a clearance space for the fabric.

6. A sewing machine including in combination a standard, a member projecting laterally therefrom at the upper end of the standard, an arm projecting forwardly from said laterally projecting member, a depending support carried by said arm at the forward end thereof, a work supporting arm carried by said depending support and having its free end terminating underneath the laterally projecting member, stitch forming mechanism operating at the free end of said work supporting arm and feeding mechanism for feeding the fabric off from the work supporting arm as it is stitched, said depending support and work supporting arm having a clearance space underneath the same whereby tubular articles may be stitched, said depending support and work supporting arm being disposed in a plane cutting the vertical axis of the standard at an acute angle whereby a clear range of vision may be had from the operator's normal working position.

7. A sewing machine including in combination a standard, a horizontal arm supported by said standard, a depending support carried at the forward end of said arm, a work supporting arm mounted at the lower end of the depending support and having its free end terminating adjacent the standard, an operating shaft located in said horizontally disposed arm, stitch forming devices including a looper operating at the free end of said work supporting arm, feeding mechanism including a feed dog for feeding the fabric off from the free end of the arm and devices extending through said depending support for actuating the looper and the feeding mechanism from said shaft in the horizontal arm, said depending support and work supporting arm being disposed in a plane cutting a line containing the vertical axis of the standard at an acute angle whereby a clear range of vision may be had from the operator's normal working position.

8. A sewing machine including in combination a standard, a horizontal arm supported by said standard, a depending support carried at the forward end of said arm, a work supporting arm mounted at the lower end of the depending support and having its free end terminating adjacent the standard, an operating shaft located in said horizontally disposed arm, stitch forming devices including a looper operating at the free end of said work supporting arm, feeding mechanism including a feed dog for feeding the fabric off from the free end of the arm, devices extending through said depending support for actuating the looper and the feeding mechanism from said shaft in the horizontal arm, said depending support and work supporting arm being disposed in a plane cutting the vertical axis of the standard at an acute angle, whereby the operator may have an unobstructed view of the stitching point.

9. A sewing machine including in combination a standard, a laterally projecting member at the upper end of the standard, a main horizontal shaft located in the standard and laterally projecting member, an arm carried at the outer end of the laterally projecting member and extending forwardly therefrom, a depending support at the forward end of said arm, a work supporting arm suspended by said depending support so as to provide a clearance space underneath the same, said depending support being inclined to the vertical, said work supporting arm being parallel with the second arm and terminating underneath the laterally projecting member intermediate the ends thereof, and stitching mechanism operating at the free end of the work supporting arm and including a needle bar, needles carried thereby, means for supporting the needle bar by said laterally projecting member and means within the laterally projecting member for reciprocating the needle bar from said main shaft.

10. A sewing machine including in combination a standard, a laterally projecting member at the upper end of the standard, a main horizontal shaft located in the standard and laterally projecting member, an arm carried at the outer end of the laterally projecting member and extending forwardly therefrom, a depending support at the forward end of said arm, a work supporting arm suspended by said depending support so as to provide a clearance space underneath the same, said depending support being inclined to the vertical, said work supporting arm being parallel with said forwardly extending arm and terminating underneath the laterally projecting member intermediate the ends thereof, and stitching mechanism operating at the free end of the work supporting arm and including a needle bar, needles carried thereby, means for supporting the needle bar by said laterally projecting member, a needle lever located in said laterally projecting member and connected to the needle bar and means for oscillating said lever from said main shaft.

11. A sewing machine including in combination a laterally projecting member at the upper end of the standard, a main horizontal shaft located in the standard and laterally projecting member, an arm carried at the outer end of the laterally projecting member and extending forwardly therefrom, a depending support at the forward end of said arm, a work supporting arm suspended by said depending support so as to provide a clearance space underneath the same, said depending support being inclined to the vertical, said work supporting arm being parallel with the said forwardly extending arm and terminating underneath the laterally projecting member intermediate the ends thereof, stitch forming mechanism operating at the free end of the work supporting arm and including a needle bar, needles carried thereby, means for supporting the needle bar by said laterally projecting member, a needle lever located in said laterally projecting member and connected to the needle bar, said main shaft having a crank formed therein and a link for connecting the crank to the lever for oscillating the needle lever.

12. A sewing machine including in combination a laterally projecting member at the upper end of the standard, a main horizontal shaft located in the standard and laterally projecting member, an arm carried at the outer end of the laterally projecting member and extending forwardly therefrom, a depending support at the forward end of said arm, a work supporting arm suspended by said depending support so as to provide a clearance space underneath the same, said depending support being inclined to the vertical, said work supporting arm being parallel with the said forwardly extending arm and terminating underneath the laterally projecting member intermediate the ends thereof, stitch forming mechanism operating at the free end of the work supporting arm and including a plurality of needles and cross thread laying devices, means for reciprocating the needles from said main shaft and means for actuating said cross thread laying devices from said main shaft in the laterally projecting member.

13. A sewing machine including in combination a standard, a laterally projecting member at the upper end of the standard, a main horizontal shaft located in the standard and laterally projecting member, an arm carried at the outer end of the laterally projecting member and extending forwardly therefrom, a depending support at the forward end of said arm, a work supporting arm suspended by said depending support so as to provide a clearance space underneath the same, said depending support being inclined to the vertical, said work supporting arm being parallel with said forwardly extending arm and terminating underneath the laterally projecting member intermediate the ends thereof, stitch forming mechanism operating at the free end of the work supporting arm and including a plurality of needles, a needle bar carrying said needles, cross thread laying devices, a needle lever disposed in said laterally projecting member and oscillated by the main shaft for reciprocating the needle bar, an eccentric on the main shaft in the laterally projecting member, devices actuated thereby for operating the thread laying devices, horizontally disposed trimming members for trimming the edges of the fabric sections prior to the stitching of the same and means actuated by said main shaft in the laterally projecting member for operating the trimming members.

14. A sewing machine including in combination a standard, a laterally projecting member at the upper end of the standard, a main shaft located in the standard and laterally projecting member, an arm carried at the outer end of the laterally projecting arm and extending forwardly therefrom and at right angles thereto, a depending support at the forward end of said arm, a work supporting arm suspended by said depending support so as to provide a clearance space underneath the same, said depending support being inclined to the vertical, said work supporting arm being parallel with the forwardly projecting arm and terminating underneath the laterally projecting member intermediate the ends thereof, a shaft in said forwardly projecting arm extending from end to end thereof and having operative connections with the main shaft, and stitch forming mechanism operating at the free end of said work supporting arm and including a looper, a looper shaft extending endwise of the work supporting arm and means operated by said shaft in the forwardly projecting arm and extending through the depending support for oscillating the looper shaft.

15. A sewing machine including in combination a standard, a laterally projecting member at the upper end of the standard, a main shaft located in the standard and laterally projecting member, an arm carried at the outer end of the laterally projecting member and extending forwardly therefrom and at right angles thereto, a depending support at the forward end of said forwardly projecting arm, a work supporting arm suspended by said depending support so as to provide a clearance space underneath the same, said depending support being inclined to the vertical, said work supporting arm being parallel with the forwardly projecting arm and terminating underneath the laterally projecting member intermediate the ends thereof, a shaft in said forwardly projecting arm extending from end to end thereof and having operative connections with the main shaft, stitch forming mechanism operating at the free end of said work supporting arm and including a looper, a looper shaft extending endwise of the work supporting arm and means operated by said shaft in the forwardly projecting arm and extending through the depending support for oscillating the looper shaft, a feed dog at the free end of the work supporting arm, a feed bar extending endwise of the arm and carrying the feed dog, a rock shaft at the opposite end of the work supporting arm from the feed dog and means for oscillating said rock shaft from said shaft in the forwardly projecting arm.

16. A sewing machine including in combination a standard, a laterally projecting member at the upper end of the standard, a main shaft located in the standard and laterally projecting member, a forwardly projecting arm carried at the outer end of the laterally projecting member and extending forwardly therefrom and at right angles thereto, a depending support at the forward end of said forwardly projecting arm, a work supporting arm suspended by said depending support so as to provide a clearance space underneath the same, said depending support being inclined to the vertical, said work supporting arm being parallel with said forwardly projecting arm and terminating underneath the laterally projecting member intermediate the ends thereof, a shaft in said forwardly projecting arm extending from end to end thereof and having operative connections with the main shaft, stitch forming mechanism operating at the free end of said work supporting arm and including a looper, a looper shaft extending endwise of the work supporting arm, means operated by said shaft in the forwardly projecting arm and extending through the depending support for oscillating the looper shaft, a feed dog at the free end of the work supporting arm, a feed bar extending endwise of the arm and carrying the feed dog, a rock frame at the opposite end of the work supporting arm from the feed dog and means for oscillating said rock frame from said shaft in the forwardly projecting arm, and means actuated by said rock frame for moving the looper shaft endwise.

17. A sewing machine including in combination a standard, a laterally projecting member at the upper end of the standard, a main shaft located in the standard and laterally projecting member, a forwardly projecting arm carried at the outer end of the laterally projecting member and extending forwardly therefrom and at right angles thereto, a depending support at the forward end of said forwardly projecting arm, a work supporting arm suspended by said depending support so as to provide a clearance space underneath the same, said depending support being inclined to the vertical, said work supporting arm being parallel with the forwardly projecting arm and terminating underneath the laterally projecting member intermediate the ends thereof, a shaft in said forwardly projecting arm extending from end to end thereof and having operative connections with the main shaft, stitch forming mechanism operating at the free end of said work supporting arm and including a looper, a looper shaft extending endwise of the work supporting arm, means operated by said shaft in the forwardly projecting arm and extending through the depending support for oscillating the looper shaft, a feed dog at the free end of the work supporting arm, a feed bar extending endwise of the arm and carrying the feed dog, a rock frame at the opposite end of the work supporting arm from the feed dog and means for oscillating said rock frame from said shaft in the forwardly projecting arm, and means actuated by said rock frame for moving the looper shaft endwise, and devices operated by said looper shaft for raising and lowering the feed bar.

In testimony whereof, I affix my signature.

SAMUEL GEORGE TATE.